June 19, 1951  J. HENRICKSON  2,557,539
CAKE CUTTER
Filed Sept. 10, 1948

Inventor
Josephine Henrickson

By Clarence A. O'Brien
and Harvey B. Jacobson
Attorneys

Patented June 19, 1951

2,557,539

UNITED STATES PATENT OFFICE 2,557,539

CAKE CUTTER

Josephine Henrickson, Climax, Minn.

Application September 10, 1948, Serial No. 48,737

1 Claim. (Cl. 30—287)

The present invention relates to new and useful improvements in cake cutters and more particularly to a cutter for use in cutting the contents of a square or rectangular shaped pan into block-like portions.

An important object of the invention is to provide a cutter comprising a plurality of spaced apart parallel blades to simultaneously cut a cake or other bakery products along parallel lines to thus cut the cake into uniform portions.

A further object of the invention is to provide gauge bar projecting horizontally at one end of the group of knives for use as a guide and gauge for properly positioning and moving the cutter with respect to previously formed lines cut in the cake.

A still further object is to provide a tool of this character of simple and practical construction, which is neat and attractive in appearance, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
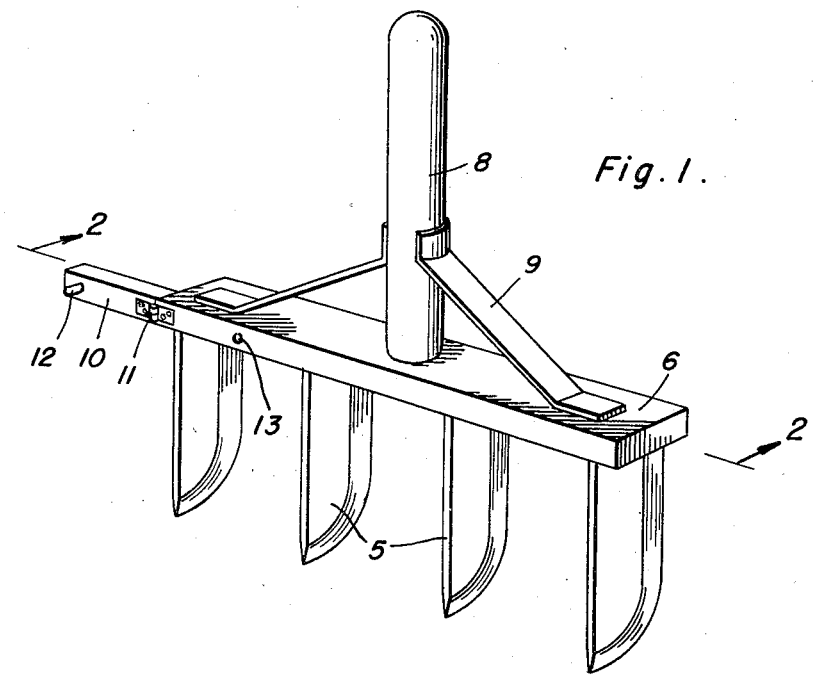
Figure 1 is a perspective view.
Figure 2:
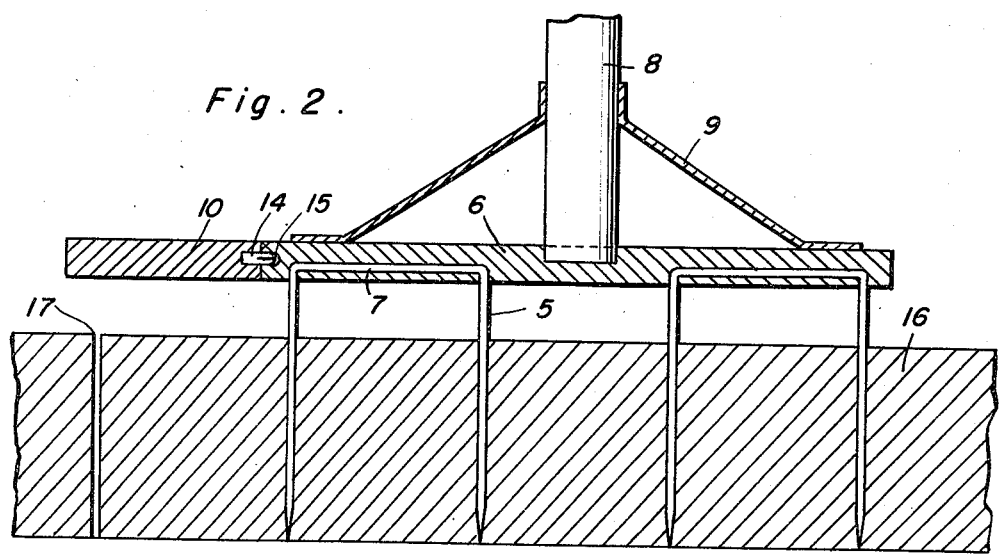
Figure 2 is a longitudinal sectional view taken on the line 2—2 of Figure 1.

Referring now to the drawing in detail wherein for the purpose of illustration I have disclosed a preferred embodiment of the invention the numeral 5 designates a plurality of cutters preferably constructed in the form of knife blades suitably secured in a downwardly extending spaced parallel relation with respect to each other to the underside of a backing plate 6.

In the present embodiment of the invention the cutters 5 are shown constructed in pairs and of U-shaped construction with their upper or bight portions 7 embedded or otherwise suitably secured in the backing plate 6 to project downwardly therefrom.

A handle 8 rises from the central portion of the backing plate 6 and is provided with braces 9 extending from the handle toward the outer end of the backing plate.

Figure 3:
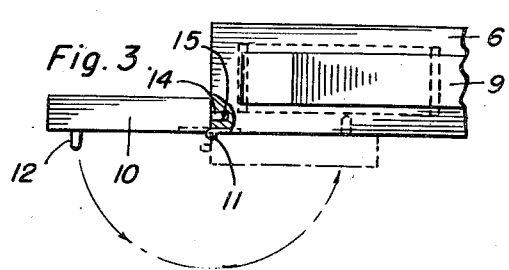
Figure 3 is a fragmentary top plan view with parts broken away and shown in section and showing the gauge bar in open and folded positions.

A gauge bar 10 is hinged to one end of the backing plate 6 as shown at 11 for swinging horizontally into an outwardly extending position at the end of the backing plate as shown by the full line in Figure 3 of the drawing, or into a position at one side of the backing plate as shown by the dotted line in Figure 3. One side of the gauge bar 10 is formed with a horizontal pin 12 and spaced from the adjacent end cutter 5 a distance equal to the spacing of the cutters from each other.

The longitudinal edge of the backing plate 6 against which the gauge bar 10 is folded is formed with a recess 13 in which the guide pin 12 is received when the gauge bar is moved into its folded position.

The inner end of gauge bar 10 is also formed with a pin 14 received in a recess 15 at the adjacent end of backing plate 6 when the gauge bar is moved to its open position.

In the operation of the device the cutters 5 are drawn through a cake 16 or other pastry or food products baked in a square or rectangular shaped pan to cut the product along parallel lines. The product may then be cut crosswise to form squares of uniform size.

Where the pan is wider than the length of the backing plate 6 the gauge bar 10 is used by swinging the same outwardly at the end of the backing plate 6 as shown by the full line in Figure 3 and after the cake is initially cut by the cutters 5 the guide pin 12 serves as a gauge or guide for movement along the line of the previously formed cut 17 during cutting of a subsequent portion of the product.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A cake cutter comprising a rigid bar, a handle rising therefrom, a plurality of blades extending downwardly from the bar in spaced parallel relation to each other, a gauge bar pivoted to one end of the first named bar and swingable outwardly into the plane of said rigid bar from a folded position at one side of the rigid bar to an open outwardly projecting position at the end of the rigid bar, and a guide pin projecting laterally from the gauge bar to be placed in alignment with a previously cut line in the cake to guide the knife during a subsequent cutting operation.

JOSEPHINE HENRICKSON.

REFERENCES CITED

The following references are of record in the file of this patent:

UNITED STATES PATENTS

| Number | Name | Date |
|---|---|---|
| 1,128,479 | McPherson | Feb. 16, 1915 |
| 2,134,839 | Perkins | Nov. 1, 1938 |
| 2,176,733 | Fanning | Oct. 17, 1939 |

FOREIGN PATENTS

| Number | Country | Date |
|---|---|---|
| 14,603 | Great Britain | June 25, 1907 |